Feb. 9, 1932.   F. S. STICKNEY   1,844,529
PRECISION INSTRUMENT
Filed Nov. 5, 1930
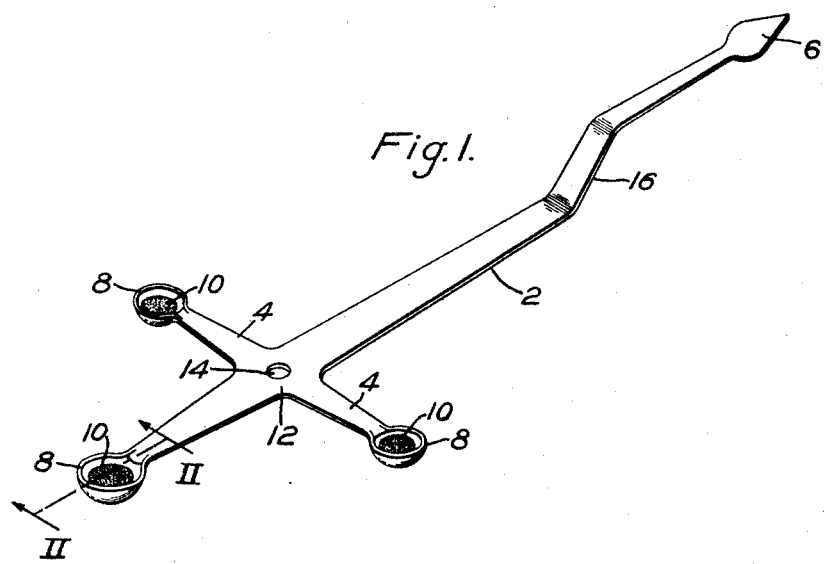
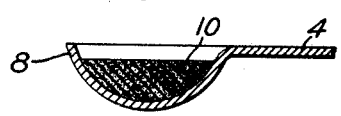
INVENTOR
Fernald S. Stickney.
BY
ATTORNEY Patented Feb. 9, 1932

1,844,529

UNITED STATES PATENT OFFICE

FERNALD S. STICKNEY, OF WEST ORANGE, NEW JERSEY, ASSIGNOR TO WESTINGHOUSE ELECTRIC & MANUFACTURING COMPANY, A CORPORATION OF PENNSYLVANIA

PRECISION INSTRUMENT

Application filed November 5, 1930. Serial No. 493,497.

My invention relates to precision instruments and particularly to methods of, and means for, balancing such instruments.

One object of my invention is to facilitate and expedite the balancing of precision instruments during individual and mass production thereof and at times subsequent thereto.

Another object of my invention is to prevent damage to delicate instrument parts during the operation of balancing them.

Another object of my invention is to reduce the operating force ordinarily applied in balancing an instrument.

Another object of my invention is to reduce the number of parts usually included in the balancing structures of measuring instruments.

Another object of my invention is to obtain proper balance of an instrument by the addition of substantially minimum weight thereto.

Another object of my invention is to provide an instrument balance structure that shall be free of screw threads and cooperating screw-threaded balance weights or nuts therefor.

A further object of my invention is to provide an instrument that shall be simple and durable in construction, economical to manufacture and effective in its operation.

Heretofore, it has been usual, in the measuring instrument art, to provide the indicating elements, or pointers, with balance weights or nuts.

In this practice, it is necessary to screw thread the balance arms of the pointers and to provide nuts or weights of comparatively expensive character because they are constructed especially for balancing purposes of relatively expensive materials.

In mounting the nuts, which is done by hand, undue force is frequently applied to the delicate parts, such as jewel and pivot bearings, associated with the pointers, so that damage results.

Balancing a pointer by the use of nuts is also a tedious, painstaking and expensive process.

In practicing my invention, I provide an indicating element or pointer with a portion for receiving a hardening fluid balance-weight material, thereby ensuring effective balance, with substantially minimum effort, material, time and expense, obtaining all of the above-mentioned objects of my invention by overcoming the above-mentioned objections to prior devices and obtaining a device that is, in general, an improvement over other instruments of this kind.

Figure 1 of the accompanying drawings is a perspective view of an instrument pointer embodying my invention, and Figure 2 is an enlarged view, taken along the line II—II of Fig. 1.

The pointer, while of any suitable shape and construction, is preferably cruciform and of a single piece of relatively thin sheet-material, such as aluminum, and is provided with a main-indicating arm 2, balance arms 4, a target portion 6 on the main arm 2, and portions 8, on the balance arms 4, for receiving and positioning balance-weight bodies 10. The pointer further comprises a portion 12, at the intersection of the arms, having an opening 14 therein, for mounting the pointer on a usual spindle, and may lie substantially all in one plane or have a portion 16 for causing portions of the main arm 2 to lie in different plains.

The portions 8, while they may be of other suitable shapes, numbers and locations, are preferably in the form of cups, three in number and disposed, respectively, at the ends of the balance arms 4.

The bodies 10 are of a material, such as asphaltum or the like, which, at certain temperatures above that to which the instrument is normally subjected in service, is of a suitably viscous nature. This material is preferably such that, at temperatures above 65° C., it is fluid and capable of adhering to the pointer, and at room temperatures, it is stable and non-volatile and the exposed surface thereof is non-adhesive.

In balancing the pointer, after assembly with its correlated parts, the portions or cups 8 are first heated and the bodies 10, while in a heated flowing state, are then placed in them.

By the use of a suitable, preferably electric, heater in the form of a pencil and a projector or gun holding a supply of the balance-weight material, both of which may be combined in one implement not constituting part of my present invention, or by other means, the cups may be preheated and the weight material added thereto in a facile, delicate manner, without undue care on the part of the operator, and without undue stress on the indicating-pointer assembly.

Upon cooling the cups and the weight material, they are in permanent adherence to each other, under normal conditions. The material is of such nature as to lose no weight by evaporation of volatilization, and the exposed surface of the material is non-adhesive.

The device and method are conducive to extreme flexibility in effecting the adjustments because the weight material may be removed and added, at will, before and after hardening, merely by the use of local heat and a delicate touch, it being never necessary, as in structures embodying screw-threaded nuts or weights, to apply force which may distort or displace the pointer and its associated parts.

Since the balance-weight material may be carried about in bulk, before being deposited on the pointers, the necessity for maintaining a stock, or the manipulation, of very small balance members is avoided. Many other advantages are inherent in my invention, which, while shown and described in one particular form, may be variously modified without departing from the spirit or scope thereof, as set forth in the appended claims.

I claim as my invention:

1. A precision indicator comprising a portion for receiving and positioning a body of moldable material for balancing the indicator.

2. A precision indicator comprising an indicating element and a portion for receiving and positioning a body of moldable material for balancing the element.

3. A meter pointer comprising an indicating arm and a balance arm including a portion for receiving and positioning a body of moldable material for balancing the pointer.

4. A meter pointer and a body of moldable material molded in adhering relation thereto and constituting the sole added balance weight means therefor.

5. A meter pointer having a cup portion for the reception of a body constituting a balance weight.

6. A meter pointer including a cup and a body of moldable material adhering to the inside of the cup.

7. A meter pointer comprising a single integral piece of material having an indicating arm and a plurality of balance arms having cup portions at their outer ends.

8. A meter pointer comprising a single integral piece of sheet material having an indicating arm and a plurality of balance arms having cup portions at their outer ends.

9. The method of balancing an instrument which comprises heating a portion thereof and in placing against said portion a body of material heated to such degree that, when so heated, is in a suitable flowing state to permit placement thereof but which hardens in adherence to said portion when the temperature of the portion and the body are reduced to the ordinary values under which the instrument operates.

10. A precision indicator including an aluminum element having a balance-weight receiving portion and a balance-weight body of organic material adhering to said portion that is of viscous fluid nature above 65° C., and of non-viscous, non-volatile nature at ordinary room temperatures.

11. A meter pointer having a portion at a predetermined position thereon to receive and position a body of moldable material for balancing the pointer and a body of moldable material molded in position on said receiving portion in interlocking relation thereto against movement relative thereto in predetermined direction.

12. A meter pointer having a portion at a predetermined local position thereon offset from the adjacent surfaces thereof to receive and position a body of moldable material for balancing the pointer and a body of moldable material molded in position on the pointer in co-operative holding and positioning relation to said offset portion.

In testimony whereof, I have hereunto subscribed my name this 29th day of October, 1930.

FERNALD S. STICKNEY.